March 11, 1958 S. S. KWOLEK 2,825,989
SLIDE FRAME
Filed Feb. 3, 1954
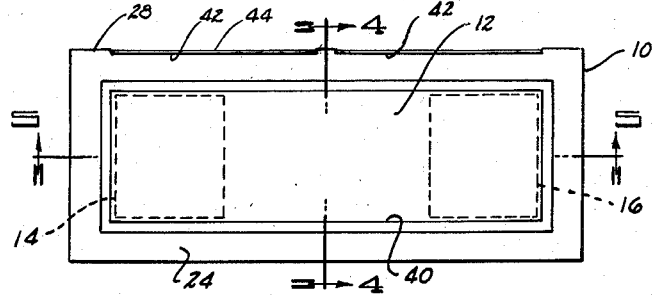
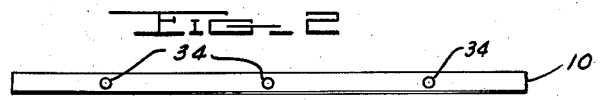
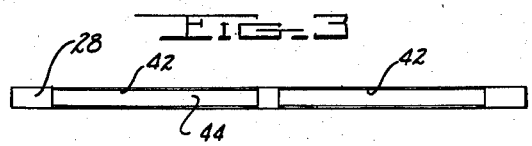
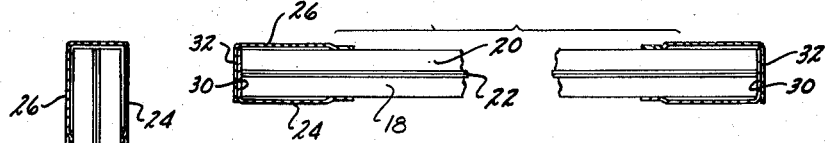
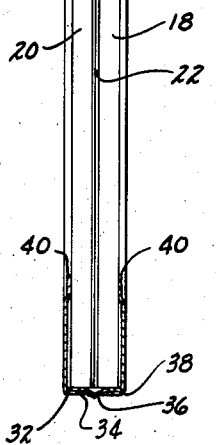
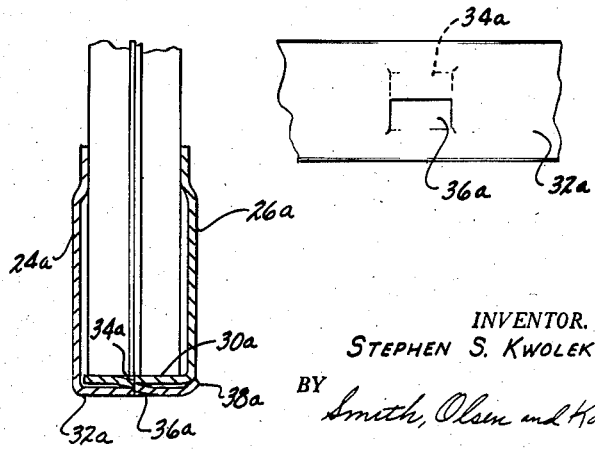
INVENTOR.
STEPHEN S. KWOLEK
BY Smith, Olsen and Katts
ATTORNEYS

2,825,989

SLIDE FRAME

Stephen S. Kwolek, Garden City, Mich., assignor to Joseph M. Kwolek, Garden City, Mich.

Application February 3, 1954, Serial No. 407,933

5 Claims. (Cl. 40—152)

The present invention relates to apparatus for mounting stereo film transparencies, and more particularly to the frames for mounting the slides containing such stereo film transparencies.

It is the principal object of the present invention to provide an improved frame for mounting slides, said frame being constructed and arranged so that the slide assembly can be quickly and easily put together and fastened into a compact, sturdy unit, and, when desired, the unit can be disassembled with equal facility.

It is another object of the present invention to provide an improved frame of the foregoing character which is formed as a one-piece sheet metal stamping and can be closed in a single folding operation so as to provide a simple and economical device for mounting stereo film slides.

It is still another object of the present invention to provide a frame for slides of the foregoing character which has a novel construction permitting identification of the slide whether the latter is being used in a stereo film viewer or in a slide carrying case, said frame also being characterized in that it provides a tight joint abutting against the exposed portion of the slide so that the latter will remain neat and clean.

It is still a further object of the present invention to provide a novel combination of glass slide and frame for the same which is characterized by the manner in which it can be readily identified and used.

Other objects of this invention will appear in the following description and appended claims, reference being had to the accompanying drawings forming a part of this specification wherein like reference characters designate corresponding parts in the several views.

In the drawings:

Fig. 1 is a front elevation of a frame embodying the present invention and illustrating a glass slide carried within the frame;

Fig. 2 is a bottom view of the frame shown in Fig. 1;

Fig. 3 is a top view of the frame shown in Fig. 1;

Fig. 4 is a section taken on the line 4—4 of Fig. 1;

Fig. 5 is a fragmentary section taken on the line 5—5 of Fig. 1;

Fig. 6 is an enlarged fragmentary section of a modified embodiment of the invention; and Fig. 7 is a fragmentary bottom view of the modification shown in Fig. 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawing, a more detailed description of the present invention will be given. The frame 10 is shown in its assembled form holding a glass slide 12 within which is carried a pair of associated stereo film transparencies 14 and 16.

The glass slide 12 comprises a pair of glass plates 18 and 20 between which is held a mounting panel 22 for mounting the transparencies 14 and 16. The manner in which the transparencies are mounted and the slide is assembled is explained in greater detail in my prior application, Serial No. 305,870, filed August 22, 1952, and these features, per se, form no part of the present invention.

The frame 10 is formed preferably from sheet metal by a stamping operation. It has a front section 24 and a rear section 26 which are integrally joined by a webbing 28 at the upper edge, such webbing serving as a hinge when the sections are opened and closed. The peripheral edges of the sections 24 and 26 are bent inwardly toward one another to form overlapping edge portions. Thus, section 24 has inturned edge portions 30 which fit inside corresponding inturned edge portions 32 in the other section 26.

The sections 24 and 26 are maintained in a closed position by fastening means preferably formed in the bottom edge portions of the sections 24 and 26. One such means can be seen in Figs. 2 and 4 wherein three apertures 34 are shown in the edge portion 32 of section 26 and mating indentations 36 are formed in the edge portion 30 of section 24. As can be understood, the sections will be held together whenever the indentations 36 are snapped into the apertures 34, and when it is desired to open the sections 24 and 26 it is only necessary to pry down the edge of section 26 so that the fastening means will be released.

Other types of fastening means may also be used. Another such means is shown in Figs. 6 and 7 where the overlapping edge portions 30a and 32a have associated tangs 34a and 36a for holding the sections 24a and 26a together. Still another arrangement that may be used either alone or with the fastening means described above is shown in Figs. 4 and 6. In this arrangement the edge portions 32 or 32a are of sufficient size so that the extreme edge can be rolled over the corner of the section 26 or 26a as shown at 38 or 38a. As stated above, this last fastening means may be used alone or with edge portions having some form of detent means.

The fastening means serve not only to hold the frame 10 together, but also to maintain a tight joint between the inner peripheries 40 of the frame 10 and the glass plates 18 and 20. The inner peripheries are bent inwardly during the stamping operation so that when the frame is closed the edges 40 will be urged against the glass plates 18 and 20, thus providing a tight joint which will prevent the accumulation of dust or dirt within the frame.

Another feature of the present invention is that it provides a means for readily identifying the assembled slide when the latter is carried in a slide case or container. Slots 42 are cut lengthwise in the webbing 28 so that when the slide assemblies are positioned in a slide case, such slots 42 will be uppermost. During the operation of assembling the slide a strip of cardboard 44 or the like, which has identifying words or marks typed or printed thereon can be placed over the upper edge of glass plates 18 and 20. When the frame 10 is closed around the glass plates 18 and 20 the cardboard 44 will then be in the position shown in the drawings, and the slide assembly can be easily identified.

From the foregoing description it is apparent that a compact, inexpensive frame for a slide has been provided which is ideally suited for use by the amateur as well as professional photographer. The slide assembly can be handled and passed around among several persons who are viewing slides through conventional stereo type viewers, and the transparencies mounted in the slide can be readily identified by the novel identification means provided in the frame.

Furthermore, the frame is constructed so that it can be freely inserted into and withdrawn from such a viewer without soiling the identification strips. Likewise, the frame can be used with other slides, if desired, since the frame can be easily opened and a new slide and identification strip can be inserted. The novel fastening means allows repeated opening and closing of the frame since there are no metal tabs or the like which will break off if folded over more than once. Thus, a frame having long life is assured.

The frame is also characterized by the novel sealing joint provided between the glass plates and the contacting edge of said frame. This assures a rather tight joint which holds the glass plates snugly in place and prevents accumulation of dirt and the like at this edge.

Having thus described my invention, I claim:

1. A frame for a slide adapted for use in showing film transparencies comprising a one-piece sheet metal stamping folded lengthwise to form two opposite frame sections between which a slide can be held, the folded edge of the frame having a flat surface for overlying an edge of said slide and having at least one slot in said flat surface through which indicia identifying a slide within the frame will be visible when only the folded edge can be seen.

2. A frame for a slide adapted for use in showing film transparencies comprising a one-piece sheet metal stamping folded lengthwise to form two opposite frame sections between which a slide can be held, each section having its peripheral edges turned inwardly toward the other so that a slide can be held between said sections, the folded edge of the frame having a surface extending its full length and as wide as said inturned peripheral edges and having at least one slot in said surface through which indicia identifying a slide within the frame will be visible when only the folded edge can be seen.

3. A frame as claimed in claim 2 wherein detent means are formed in the peripheral edges opposite from the folded edge for fastening said peripheral edges together.

4. A frame as claimed in claim 2 wherein the inwardly turned edges of one section are wider than the corresponding edges of the other section so that the terminal edge of the former can be bent over the turned edge of the latter for fastening said peripheral edges together.

5. A frame as claimed in claim 2 wherein each section has an aperture through which film transparencies can be viewed, the edges of said apertures being deflected toward one another so as to be urged against the slide when the sections are closed together, and means for fastening the peripheral edges of the sections together.

References Cited in the file of this patent

UNITED STATES PATENTS

| | | |
|---|---|---|
| 1,692,999 | Siegel | Nov. 27, 1928 |
| 2,165,790 | Engel | July 11, 1939 |
| 2,176,283 | Whiteford | Oct. 17, 1939 |
| 2,227,973 | Hood | Jan. 7, 1941 |
| 2,599,382 | Goldberg | June 3, 1952 |
| 2,697,889 | Heim | Dec. 28, 1954 |

FOREIGN PATENTS

| | | |
|---|---|---|
| 961,733 | France | May 19, 1950 |